United States Patent
Arzoumanian et al.

(10) Patent No.: US 8,925,994 B2
(45) Date of Patent: Jan. 6, 2015

(54) INSTRUMENT PANEL SUPPORT ASSEMBLY IN A MOTOR VEHICLE

(71) Applicant: Benteler Automobiltechnik GmbH, Paderborn (DE)

(72) Inventors: Kegham Arzoumanian, Paderborn (DE); Christian Fechtelpeter, Paderborn (DE); Andreas Hitz, Erwitte (DE); Marcus Pape, Neu-Broderstorf (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 14/199,464

(22) Filed: Mar. 6, 2014

(65) Prior Publication Data
US 2014/0252793 A1 Sep. 11, 2014

(30) Foreign Application Priority Data
Mar. 7, 2013 (DE) .......................... 10 2013 102 292

(51) Int. Cl.
*B62D 25/14* (2006.01)

(52) U.S. Cl.
CPC .................................. *B62D 25/145* (2013.01)
USPC ........... 296/72; 296/193.02; 180/90; 280/779

(58) Field of Classification Search
USPC .............. 296/70, 72, 193.02, 193.03; 180/90; 280/779
See application file for complete search history.

(56) References Cited

U.S. PATENT DOCUMENTS

| 6,450,533 B1 | 9/2002 | Kimura et al. | |
|---|---|---|---|
| 7,291,785 B2 * | 11/2007 | Riester et al. | 174/72 A |
| 7,810,873 B2 | 10/2010 | Hitz et al. | |
| 8,020,355 B2 * | 9/2011 | Monteiro | 52/745.2 |
| 8,043,681 B2 | 10/2011 | Handing et al. | |
| 8,141,903 B2 * | 3/2012 | Atsumi et al. | 280/779 |
| 8,146,986 B2 | 4/2012 | Bierkamp et al. | |
| 8,220,857 B2 * | 7/2012 | Baudart et al. | 296/72 |
| 8,256,830 B2 | 9/2012 | Hitz et al. | |
| 8,267,463 B2 | 9/2012 | Buschsieweke et al. | |
| 8,312,629 B2 | 11/2012 | Hitz et al. | |
| 8,544,905 B2 | 10/2013 | Handing et al. | |
| 2004/0178652 A1 * | 9/2004 | Yoshida et al. | 296/72 |
| 2005/0110302 A1 * | 5/2005 | Riha et al. | 296/193.02 |
| 2005/0134090 A1 * | 6/2005 | Kring et al. | 296/193.02 |
| 2007/0222200 A1 | 9/2007 | Kukubo | |
| 2008/0048470 A1 * | 2/2008 | Vican | 296/193.02 |
| 2008/0315611 A1 * | 12/2008 | Durocher | 296/72 |
| 2009/0038156 A1 | 2/2009 | Hitz et al. | |

(Continued)

FOREIGN PATENT DOCUMENTS

| DE | 197 15 069 | 2/2001 |
|---|---|---|
| DE | 112005001036 | 5/2007 |
| DE | 102008050313 | 4/2010 |
| JP | 2001063628 | 3/2001 |

*Primary Examiner* — Lori L Lyjak
(74) *Attorney, Agent, or Firm* — Henry M. Feiereisen LLC

(57) ABSTRACT

The present invention relates to an instrument panel support assembly (1) in a motor vehicle, comprising a transverse tube (2) extending substantially between the A-columns of the motor vehicle and configured for receiving a steering column, air bags, a fuse box and/or an instrument panel, wherein the instrument panel support assembly (1) is characterized in that an extruded retainer profile made of a light metal alloy encloses the transverse tube (2) at least in sections, wherein the retaining profile extends in sections in the axial direction of the transverse tube (2).

14 Claims, 6 Drawing Sheets

(56) References Cited

U.S. PATENT DOCUMENTS

| | | |
|---|---|---|
| 2009/0140553 A1 | 6/2009 | Hitz et al. |
| 2009/0162688 A1 | 6/2009 | Handing et al. |
| 2009/0302641 A1 | 12/2009 | Bierkamp et al. |
| 2010/0230997 A1 | 9/2010 | Buschsieweke et al. |
| 2010/0259064 A1* | 10/2010 | Baudart et al. .................. 296/72 |
| 2011/0187154 A1* | 8/2011 | Hirt et al. .................. 296/193.02 |
| 2011/0278876 A1 | 11/2011 | Hitz et al. |
| 2012/0098280 A1 | 4/2012 | Handing et al. |

* cited by examiner

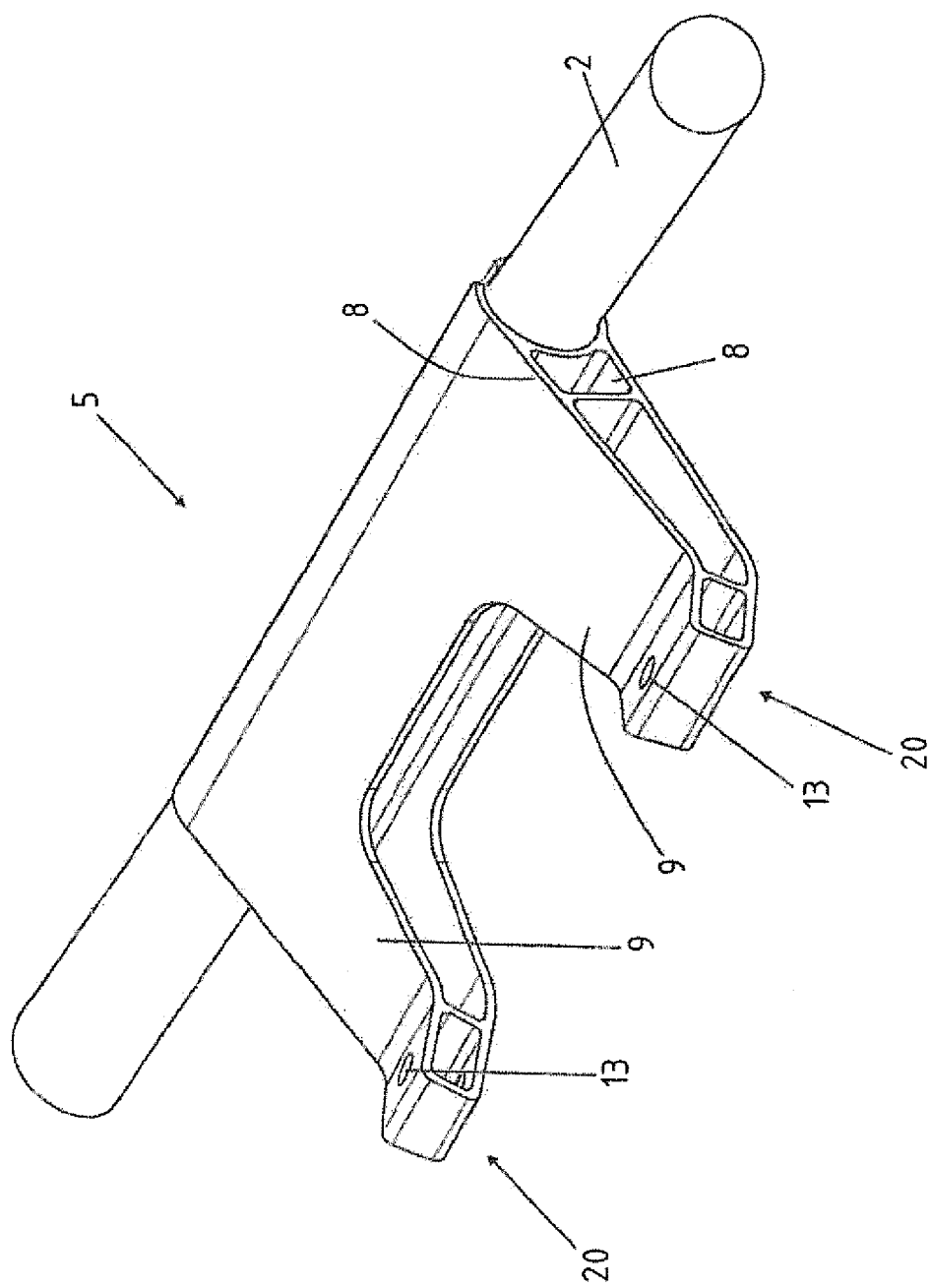

INSTRUMENT PANEL SUPPORT ASSEMBLY IN A MOTOR VEHICLE

CROSS-REFERENCES TO RELATED APPLICATIONS

This application claims the priority of German Patent Application, Serial No. 10 2013 102 292.8, filed Mar. 7, 2013, pursuant to 35 U.S.C. 119(a)-(d), the content of which is incorporated herein by reference in its entirety as if fully set forth herein.

BACKGROUND OF THE INVENTION

The present invention relates to an instrument panel support assembly in a motor vehicle.

The following discussion of related art is provided to assist the reader in understanding the advantages of the invention, and is not to be construed as an admission that this related art is prior art to this invention.

Instrument panel supports to be arranged in a motor vehicle are known in the art, wherein the instrument panel supports are arranged in the motor vehicle interior between the A-columns. The instrument panel supports typically have a transverse tube extending from one column across the width of the vehicle to the opposite column. Attachments are attached to the instrument panel support, such as a steering column, airbag units, a power distribution box or the like. To this end, holes are provided on the transverse tube of the instrument panel support or arms are attached thereto that serve to accommodate the aforementioned components.

Such instrument panel support is usually supported in a central area on a transmission tunnel of the motor vehicle by an arm, wherein the aforementioned arms are in each case materially coupled to the instrument panel support.

Because an instrument panel support is attached below a dashboard, it is a component that, on the one hand, does not have to satisfy a highly complex functionality in a crash and that, on the other hand, does not have to satisfy aesthetic design requirements. Consequently, it is important for an instrument panel support that it can be produced particularly inexpensively and functionally while simultaneously having a low weight.

It would therefore be desirable and advantageous to obviate prior art shortcomings and to provide an improved instrument panel support, to which attachments can be easily connected and/or which can be readily mounted inside a vehicle, and which is at the same time particularly inexpensive to produce and has a low weight.

SUMMARY OF THE INVENTION

According to one aspect of the present invention, an instrument panel support assembly in a motor vehicle includes a transverse tube, which extends substantially between the A-columns of the motor vehicle and is configured to accommodate a steering column, to accommodate air bags, to accommodate a fuse box and/or to accommodate an instrument panel. An extruded retaining profile made of a light metal alloy extends in sections in the axial direction of the transverse tube and surrounds at least in sections an outer surface of the transverse tube covering an angular range of 180° to 355°, wherein the retaining profile has mutually different wall thicknesses in cross-section.

According to an advantageous feature of the present invention, the transverse tube may be formed from a steel alloy or from a light metal alloy, for example an aluminum alloy. The transverse tube may be constructed as a closed hollow profile that is according to the invention surrounded on its outer surface in the longitudinal direction of the tube in sections by the retaining profile. The terms "surround" or "encompass" within the context of the invention refer enclosing the outer surface of the transverse tube over an angular range of for example more than 180°, for example between 250° and 290°, and for example 270° of the outer surface area. In an alternative embodiment, the outside of the transverse tube may also be completely surrounded by the retaining profile.

Because the outer surface is surrounded, a positive contact is realized, i.e. the transverse tube and the retaining profile are form-fittingly surrounded. The inner contour or inner surface area of the retaining profile advantageously corresponds to the outer surface of the transverse tube. In one advantageous embodiment, a transition fit is formed between the transverse tube and the retaining profile, i.e. an interference fit.

According to another advantageous feature of the present invention, the retaining profile may be constructed to have mutually different wall thicknesses in cross-section. This refers in particular to the same longitudinal section, so that for example greater wall thicknesses may be intentionally introduced in the areas to be reinforced.

The invention has a major advantage in that the transverse tube can be produced particularly cost-effectively as a continuous tube, in particular, for example, as an extruded tube. In areas where reinforcement is needed in relation to the tube longitudinal direction, this reinforcement is realized in that the retaining profile surrounds the outside, thus eliminating the need for a reinforcing patch or an increase in the wall thickness on the transverse tube itself. At the same time, a particularly good freedom of design can be realized because the retaining profile can be manufactured as an extruded light metal profile. By using an extrusion process in the production of a retaining profile, the cross-sectional configuration of the retaining profile may be changed in the longitudinal direction of the transverse tube. For example, the cross-section of the retaining profile can be made thicker in the longitudinal direction of the transverse tube and/or other geometric reinforcement options can be employed. Because according to the invention the transverse tube may be made from a steel alloy or a light metal alloy and the at least one retaining profile may formed from a light metal alloy, the instrument panel support according to the invention can be produced inexpensively, while simultaneously optimizing its weight. The transverse tube can be selectively reinforced with retaining profile.

Advantageously, to further ensure a rotation lock about the longitudinal axis of the transverse tube, the transverse tube according to the invention may preferably have in sections along its longitudinal direction an oval or a polygonal cross-section. A further positive engagement between transverse tube and retaining profile is realized with the oval or polygonal cross-section. The retaining profile has in this case an inner surface, which in turn is formed to formfittingly correspond to the outer surface of the oval or polygonal cross-section of the transverse tube.

According to another advantageous feature of the present invention, a coating may be disposed between the transverse tube and the retaining profile is formed or a foil may be arranged between the transverse tube and the retaining profile. The coating or foil is used, on the one hand, for a corrosion protection and, on the other hand, for increasing the positive contact and thereby potentially preventing background noise generated between the retaining profile and transverse tube.

To further increase the rigidity of the instrument panel support according to the invention, the transverse tube may be coupled at least in sections with the retaining profile, in particular materially coupled and is most preferably adhesively bonded. Within the context of the invention, the inner surface of the retaining profile may be adhesively bonded to the outer surface of the transverse tube, optionally by incorporating a coating or a foil. However, within the context of the present invention, the retaining profile and the transverse tube may also be coupled with each other at least in sections, for example at points, by a thermal joining process, in particular a soldering process or a welding process.

Advantageously, the retaining profile also has an integrated functionality such that the transverse tube is not only locally reinforced at least in sections, but that the transverse tube or the retaining profile can be supported by way of an arm, which is in particular integrally formed on the retaining profile as a single piece and made of the same material. For example, a steering column can then be connected on the retaining profile on the dashboard support. Optionally or alternatively, instead of affixing an attachment part to an arm that is formed on the retaining profile as a single piece and made of the same material, a holder or a support arm may be coupled to the attachment part to support the transverse tube itself. For example, a support arm supporting the instrument panel support relative to the transmission tunnel of the motor vehicle may be coupled to a retaining profile disposed centrally on the transverse tube with a respect to the vehicle coordinate system.

According to another advantageous feature of the present invention, the arm itself may have on in the retaining profile a bead, a recess and/or an embossing in order to additionally increase in stiffness of the retaining profile and/or in order to be particularly rigidly supported in relation to the retaining profile. The arm hereby extends to the outside, in particular in relation to the radial direction; however, this does not mean within the context of the invention that the arm projects exclusively radially outwardly in relation to a longitudinal axis of the transverse tube, but only means that the arm is oriented outwardly. Therefore, the arm may also be oriented at an angle to the solely radial direction, starting a distance from the central longitudinal axis.

According to another advantageous feature of the present invention, the retaining profile may be formed as an extruded hollow profile and the arm itself may thus have an additional support, with which the arm is coupled to the retaining profile. This significantly increases the bending stiffness of the arm, preventing the arm from buckling or bending under a tangential load.

According to another advantageous feature of the present invention, a second arm may be formed on the retaining profile, which is, for example, oriented at an angle in relation to the first arm or is formed so as to protrude relative to the retaining profile on an opposite side of the transverse tube. In this way, for example, a support and a seat can be realized with the retaining profile at the same time. The retaining profile itself may have increased strength compared to the instrument panel support so as to face the resulting additional stress caused by the simultaneous accommodation and support on a longitudinal section. A greater wall thickness could also be introduced.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 is a perspective view of a retaining profile according to the invention.

DETAILED DESCRIPTION OF PREFERRED EMBODIMENTS

Throughout all the figures, same or corresponding elements may generally be indicated by same reference symbols. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
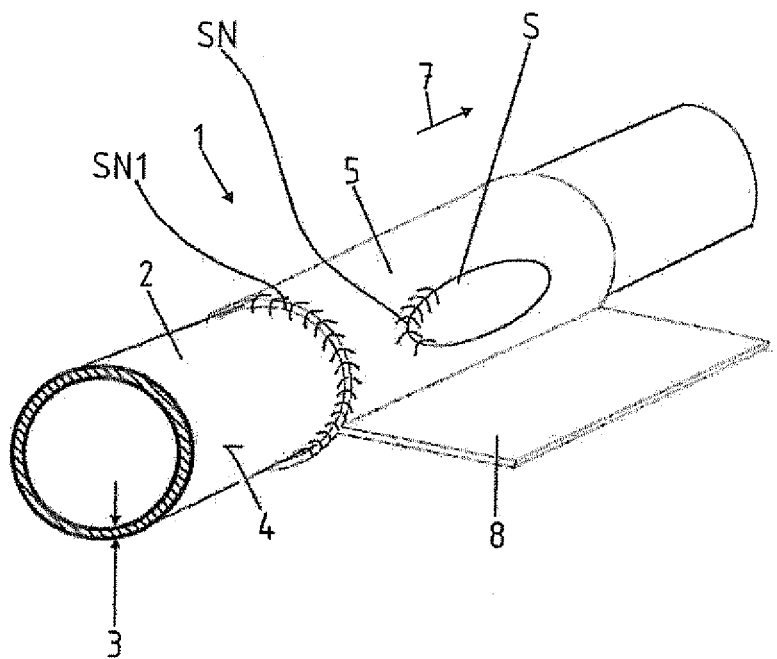
FIGS. 1a and b is a perspective view and a cross-sectional view through an instrument panel support assembly according to the invention.
Figure 1:
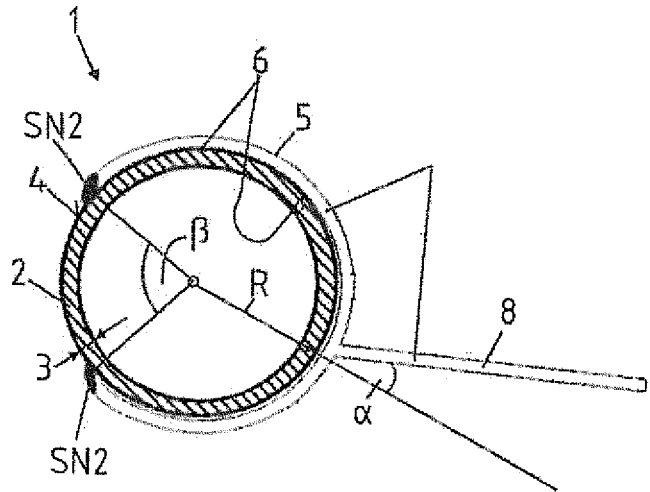

Turning now to the drawing, and in particular to FIGS. 1a and b, there is shown an instrument panel support assembly 1 according to the invention, which has a transverse tube 2 having a constant wall thickness 3. The transverse tube 2 is surrounded on its outer surface 4 by a retaining profile 5 at least in sections, in seen most clearly in FIG. 1b. An inner surface of the retaining profile 5 hereby rests in contact on the outer surface 4 of the transverse tube 2. Optionally, a coating or a foil may be incorporated between the inner surface 6 of the retaining profile 5 and the outer surface 4 of the transverse tube 2. The retaining profile 5 itself extends in the longitudinal direction 7 of the transverse tube 2 at least in sections and surrounds or encompasses the transverse tube 2. The transverse tube 2 is surrounded, as also seen clearly in FIG. 1b, in an angular range of preferably 270°. An arm 8 which is integrally formed as a single piece with and from the same material as the retaining profile 5 projects outwardly at an angle α with respect to the radial direction R from the retaining profile 5. Preferably, the retaining profile 5 is formed from an extruded light metal profile.

Within the context of the invention, as shown in FIG. 1a, a welding window S may be formed in the retaining profile 5, wherein the retaining profile 5 and the transverse tube 2 are then coupled together by a weld seam SN. Alternatively or additionally, an additional weld seam SN1 may be formed all round the edge of the retaining profile 5. Alternatively or additionally, as clearly seen in FIG. 1b, an additional weld seam SN2 may be formed between the retaining profile 5 and transverse tube 2 at the boundary between the not-surrounded area and the surrounded area. FIG. 1b also shows an opening angle β, where the retaining profile 5 does not surround the transverse tube 2. Preferably, the opening angle β has an angular range between 180° and 355°, in particular between 200° and 300°, and most preferably between 250° and 290°, and in particular of 270°.

Figure 2:
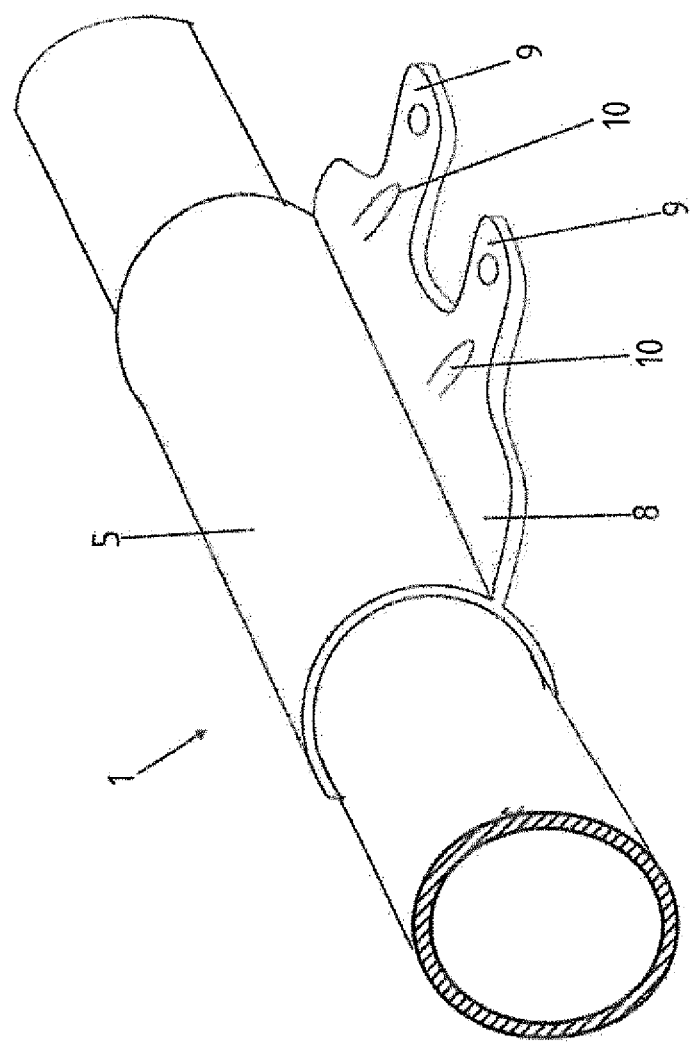
FIG. 2 is the view of FIG. 1 with a modified retaining profile.

FIG. 2 shows the same diagram as in FIG. 1a, with the difference that the arm 8 of the retaining profile 5 is machined by cutting and embossing. Thus, the arm 8 has two tongues 9 produced by cutting, to which for example a steering column can be coupled. To provide the arm 8, but also the tongues 9 with enhanced rigidity, a corresponding embossing 10 is also formed, which increases the bending stiffness of the arm 8 and the tongue 9.

The tongue 9 can also be angled, but is preferably formed such as to have a flat contact surface for subsequent joining.

Figure 3:
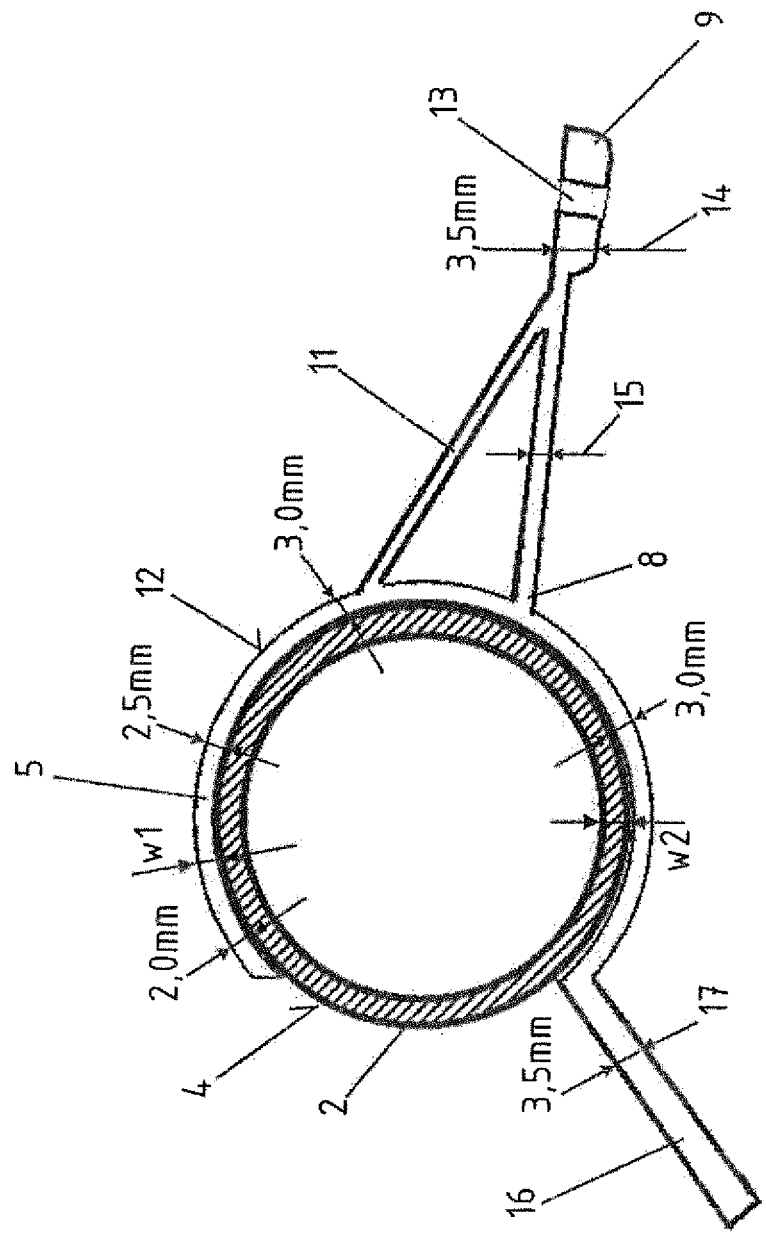
FIG. 3 is a cross-section through an instrument panel support assembly according to the invention.

FIG. 3 shows a cross-sectional view through an alternative embodiment variant of the retaining profile 5. Once again, the outer surface 4 of the transverse tube 2 at least in sections enclosed by the retaining profile 5. Furthermore, an arm 8 is integrally formed on the retaining profile 5 in one piece and made of the same material which protrudes outwardly in a radial direction with respect to the retaining profile 5. The arm 8 has an additional support 11, so that the arm 8 is better supported with respect to the outer surface 12 of the retaining element 5 and prevented, for example, from buckling or bending with respect to the retaining profile 5 which may cause the arm 8 to be deformed and breaking off. Also shown is the tongue 9 with the mounting hole 13, wherein the wall thickness 14 of the tongue 9 is thicker compared to the wall thickness 15 of the arm 8. This can be easily realized in production by varying the extrusion profile. Furthermore, the retaining profile 5 in the embodiment shown in FIG. 3 has a second arm 16 which is also formed to protrude outwardly in the radial direction from the retaining profile 5. The wall thickness 17 of the second arm 16 may also be varying, thus allowing, for example, a support on or a connection to the lower window frame, whereas a steering column is mounted on the first arm 8.

FIG. 3 also shows that the wall thickness w1, w2 of the retaining profile 5 varies along the longitudinal portion of the cross-section. For example, the retaining profile 5 has in the upper portion a wall thickness w1 of 2.0 mm, which increases towards the lower right in relation to the image plane to 2.5 mm or w2=3.0 mm. In the region of the second arm 16, the wall thickness 17 is then preferably 3.5 mm, which is identical to the wall thickness 14 of the tongue 9. This is possible because the retaining profile 5 is manufactured as an extruded light metal part, since the various wall thicknesses can be adjusted in the extrusion process.

Figure 4:
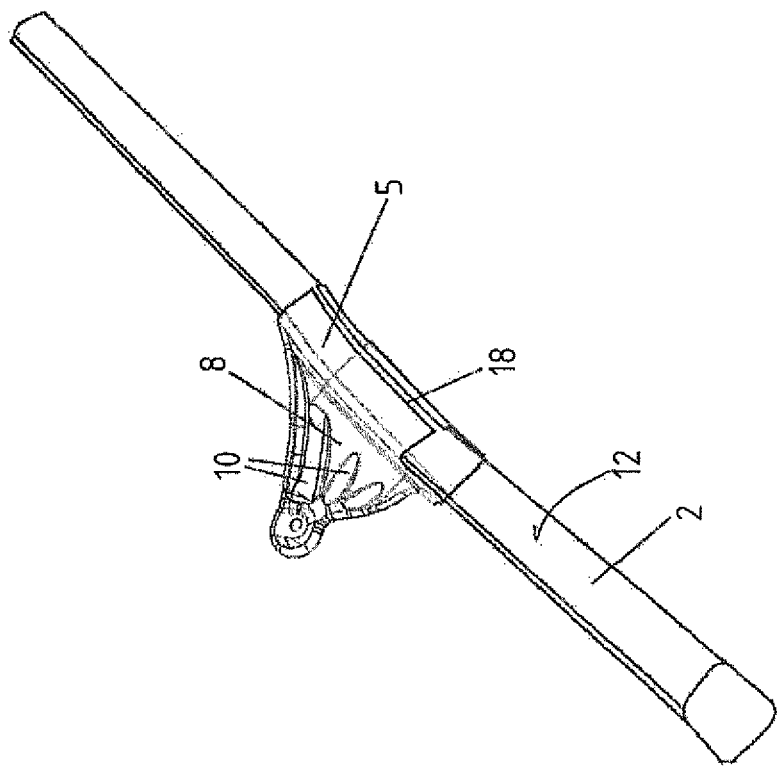
FIG. 4 is an alternative embodiment of an instrument panel support assembly according to the invention in a perspective view.

FIG. 4 shows another possible embodiment, wherein a transverse tube 2 is formed with a substantial rectangular cross-section and surrounded on the outer surface 12 by a retaining profile 5 corresponding to the rectangular cross-sectional profile. The retaining profile 5 hereby surrounds the transverse tube 2 effectively around the entire surface, with the exception of an expansion gap 18. Due to the presence of the expansion gap 18, the retaining profile 5 can be pushed on the transverse tube 2. Furthermore, the retaining profile has individual embossings 10 to reinforce the arm 8 projecting from the retaining profile 5.

Figure 5:
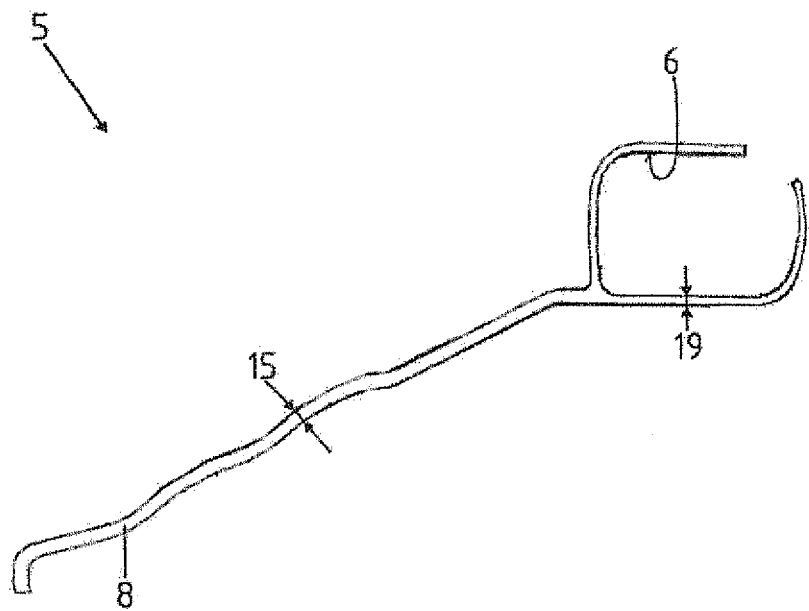
FIG. 5 is a sectional view through a retaining profile of FIG. 4.

FIG. 5 shows a cross-sectional view through the retaining profile 5 of FIG. 4. As can be clearly seen, the inner surface 6 of the retaining profile 5 has a matching rectangular cross-sectional contour that corresponds to the cross-section of the transverse tube 2 of FIG. 4. The wall thickness 15 is significantly thicker in the region of the arm 16 than the wall thickness 19 in the area where the transverse tube 2 is received.

FIG. 6 shows another alternative embodiment of a retaining profile 5 according to the invention, wherein several arms 8 are in turn formed in the shape of a hollow chamber profile. The retaining profile 5 shown in FIG. 6 surrounds the periphery of a transverse tube 2 at least in sections, with two arms 8 extending from the transverse tube in the form of a multi-chamber hollow section. Corresponding tongues 9 can here also be formed by cutting which can be further processed, as shown in FIG. 6, at their ends 20 by bending and which may further include mounting holes 13.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An instrument panel support assembly in a motor vehicle, comprising
    a transverse tube extending substantially between the A-columns of the motor vehicle and configured to receive at least one of a steering column, air bags, a fuse box and an instrument panel, and
    an extruded retaining profile made of a light metal alloy extending in sections in the axial direction of the transverse tube and surrounding at least in sections an outer surface of the transverse tube covering an angular range of 180° to 355°, wherein the retaining profile has mutually different wall thicknesses in cross-section.

2. The instrument panel support assembly of claim 1, wherein the angular range is 200° to 300°.

3. The instrument panel support assembly of claim 1, wherein the angular range is 250° to 290°.

4. The instrument panel support assembly of claim 1, wherein the angular range is 270°.

5. The instrument panel assembly of claim 1, wherein the transverse tube is in cross-section at least in sections formed in its longitudinal direction with an oval or a polygonal cross-section.

6. The instrument panel support assembly of claim 1, wherein a coating is disposed between the transverse tube and the retaining profile.

7. The instrument panel support assembly of claim 1, wherein a foil is arranged between the transverse tube and the retaining profile.

8. The instrument panel support assembly of claim 1, wherein the transverse tube is materially connected to the retaining profile.

9. The instrument panel support assembly of claim 1, wherein the transverse tube is connected to the retaining profile by an adhesive bond or a weld.

10. The instrument panel support assembly of claim 1, wherein the retaining profile in cross-section comprises an arm, which is formed to protrude radially outwardly from the retaining profile with respect to a longitudinal axis of the transverse tube.

11. The instrument panel support assembly of claim 10, wherein the arm comprises at least one of a bead, a recess and an embossing.

12. The instrument panel support assembly of claim 10, wherein the arm is coupled to the retaining profile by way of an additional support.

13. The instrument panel support assembly of claim 10, wherein the retaining profile in cross-section comprises a second arm protruding from the retaining profile.

14. The instrument panel support assembly of claim 1, further comprising a transition fit formed between the retaining profile and the transverse tube.

\* \* \* \* \*